US010540527B2

(12) United States Patent
Forster

(10) Patent No.: US 10,540,527 B2
(45) Date of Patent: Jan. 21, 2020

(54) METHOD, SYSTEM AND APPARATUS FOR NFC SECURITY

(71) Applicant: Avery Dennison Corporation, Pasadena, CA (US)

(72) Inventor: Ian J. Forster, Essex (GB)

(73) Assignee: AVERY DENNISON RETAIL INFORMATION SERVICES LLC, Mentor, OH (US)

( * ) Notice: Subject to any disclaimer, the term of this patent is extended or adjusted under 35 U.S.C. 154(b) by 214 days.

(21) Appl. No.: 13/827,113

(22) Filed: Mar. 14, 2013

(65) Prior Publication Data

US 2016/0283759 A1    Sep. 29, 2016

Related U.S. Application Data

(60) Provisional application No. 61/715,426, filed on Oct. 18, 2012.

(51) Int. Cl.
*H04W 12/12* (2009.01)
*G06K 7/10* (2006.01)
*H04W 4/80* (2018.01)

(52) U.S. Cl.
CPC .......... *G06K 7/10257* (2013.01); *H04W 4/80* (2018.02); *H04W 12/1202* (2019.01)

(58) Field of Classification Search
CPC ............. G06K 7/10257; G06K 7/0008; G06K 7/10297; G06K 19/07749; G06K 7/10366;

(Continued)

(56) References Cited

U.S. PATENT DOCUMENTS

| 1,331,136 A | 2/1920 | Woodjard |
| 5,083,111 A | 1/1992 | Drucker et al. |

(Continued)

FOREIGN PATENT DOCUMENTS

| BR | PI0611910 | 2/2011 |
| CN | 101253750 | 8/2008 |

(Continued)

OTHER PUBLICATIONS

Antoniou, Zoe, "NFC-Based Mobile Middleware for Intuitive User Interaction With Security in Smart Homes", Proc. of the 5th IASTED International Conference on Communication Systems and Networks (CSN'06), Aug. 28-30, 2006, Palma De Mallorca, Spain, Track 543-038, 6 pgs.

(Continued)

*Primary Examiner* — Minh Dinh
*Assistant Examiner* — Shu Chun Gao
(74) *Attorney, Agent, or Firm* — Avery Dennison Retail Information Services LLC

(57) ABSTRACT

A method, system and apparatus for providing security to RFID and NFC systems. In some exemplary embodiments, a smart poster may be utilized to provide appropriate or desired communications with an RFID or NFC-enabled device. Such exemplary embodiments may utilize an authorized NFC tag to communicate with an NFC-enabled device, and upon activation of the authorized NFC tag, may trigger activation or appearance of one or more related items, such as visual cues. Additionally, aspects of NFC security systems which can include regions of security, states of activity and actions performed when security violations are detected.

12 Claims, 3 Drawing Sheets

(58) Field of Classification Search
CPC ........... H04L 9/3271; H04L 2209/805; H04W 12/06; H04W 12/12; H04W 4/008; H04W 4/02; H04W 12/1202; H04W 4/80
See application file for complete search history.

(56) References Cited

U.S. PATENT DOCUMENTS

| | | | |
|---|---|---|---|
| 5,485,291 A | 1/1996 | Qiao | |
| 5,641,219 A | 6/1997 | Mizobe | |
| 5,720,123 A | 2/1998 | Taylor | |
| 5,841,350 A | 11/1998 | Appalucci et al. | |
| 5,867,017 A | 2/1999 | Merwin et al. | |
| 5,921,674 A | 7/1999 | Koczi | |
| 5,944,405 A | 8/1999 | Takeuchi | |
| 5,945,938 A | 8/1999 | Chia et al. | |
| 5,947,578 A | 9/1999 | Ayres | |
| 6,142,375 A | 11/2000 | Belka et al. | |
| 6,144,264 A | 11/2000 | Wen | |
| 6,246,778 B1 | 6/2001 | Moore | |
| 6,744,367 B1 | 6/2004 | Forster | |
| 6,771,256 B1 | 8/2004 | Abraham et al. | |
| 6,786,626 B2 | 9/2004 | Wu | |
| 6,838,989 B1 | 1/2005 | Mays et al. | |
| 6,839,035 B1 | 1/2005 | Addonisio et al. | |
| 6,851,999 B2 | 2/2005 | Fong | |
| 6,965,205 B2 | 11/2005 | Piepgras et al. | |
| 7,012,544 B2 | 3/2006 | Cunningham et al. | |
| 7,046,160 B2 | 5/2006 | Pederson et al. | |
| 7,064,498 B2 | 6/2006 | Dowling et al. | |
| 7,084,769 B2 | 8/2006 | Bauer et al. | |
| 7,086,587 B2 * | 8/2006 | Myllymaki | G06K 7/0008 235/375 |
| 7,086,769 B1 | 8/2006 | Thompson et al. | |
| 7,098,794 B2 | 8/2006 | Lindsay | |
| 7,109,986 B2 | 9/2006 | Kerr et al. | |
| 7,167,106 B2 | 1/2007 | Hasse | |
| 7,202,838 B2 | 4/2007 | Kerr et al. | |
| 7,304,577 B2 | 12/2007 | Waldner | |
| 7,375,650 B2 | 5/2008 | Lo | |
| 7,377,421 B2 | 5/2008 | Rhoads | |
| 7,378,973 B2 | 5/2008 | Dixon | |
| 7,477,152 B2 | 1/2009 | Forster | |
| 7,490,054 B2 | 2/2009 | Reade et al. | |
| 7,492,346 B2 | 2/2009 | Manabe | |
| 7,495,576 B2 | 2/2009 | Maskeny et al. | |
| 7,515,149 B2 | 4/2009 | Kerr et al. | |
| 7,564,426 B2 | 7/2009 | Poor | |
| 7,600,906 B2 | 10/2009 | Chon | |
| 7,654,723 B2 | 2/2010 | Chang | |
| 7,670,020 B2 | 3/2010 | Chang | |
| 7,695,165 B2 | 4/2010 | Chang | |
| 7,722,172 B2 | 5/2010 | Silverbrook | |
| 7,722,241 B2 | 5/2010 | Chang | |
| 7,737,858 B2 * | 6/2010 | Matityaho | H01Q 7/00 340/572.7 |
| 7,750,810 B2 | 7/2010 | Rudolf et al. | |
| 7,752,790 B1 | 7/2010 | Daryl et al. | |
| 7,756,467 B2 | 7/2010 | Bent et al. | |
| 7,810,983 B2 | 10/2010 | Chang | |
| 7,817,045 B2 | 10/2010 | Onderko | |
| 7,845,823 B2 | 12/2010 | Mueller | |
| 7,850,341 B2 | 12/2010 | Mrakovich | |
| 7,868,778 B2 | 1/2011 | Kenwright | |
| 7,876,101 B2 | 1/2011 | Lee | |
| 7,903,103 B2 | 3/2011 | Osterberg et al. | |
| 7,920,050 B2 | 4/2011 | Juels | |
| 7,959,326 B2 | 6/2011 | Laporte | |
| 7,961,097 B2 | 6/2011 | Porte et al. | |
| 7,979,026 B2 | 7/2011 | Hulvey | |
| 8,014,722 B2 | 9/2011 | Abel | |
| 8,018,345 B2 | 9/2011 | Xiang | |
| 8,068,011 B1 * | 11/2011 | Sajadi | H04M 1/7253 340/10.4 |
| 8,102,797 B2 | 1/2012 | Abel | |
| 8,112,066 B2 | 2/2012 | Ayed | |
| 8,117,445 B2 | 2/2012 | Werner | |
| 8,126,505 B2 | 2/2012 | Tulloch | |
| 8,242,893 B1 | 8/2012 | Lin | |
| 8,249,935 B1 | 8/2012 | DiMartino et al. | |
| 8,321,922 B1 | 11/2012 | Lo et al. | |
| 8,326,991 B2 | 12/2012 | Diaz et al. | |
| 8,332,272 B2 | 12/2012 | Fisher | |
| 8,469,269 B2 | 6/2013 | Daily et al. | |
| 8,474,700 B1 * | 7/2013 | Lewis | 235/379 |
| 8,638,228 B2 | 1/2014 | Amigo et al. | |
| 8,655,286 B2 | 2/2014 | Mendolia | |
| 8,937,531 B2 * | 1/2015 | Rimai | G06K 7/10069 235/375 |
| 8,961,306 B2 * | 2/2015 | LeMay | G07F 17/3218 463/30 |
| 9,024,763 B2 | 5/2015 | Hamedani | |
| 9,108,434 B2 | 8/2015 | Tsirline et al. | |
| 9,894,468 B2 | 2/2018 | Brown et al. | |
| 2002/0030992 A1 | 3/2002 | Lefebvre | |
| 2002/0036622 A1 * | 3/2002 | Jaeger | G06F 3/03545 345/173 |
| 2002/0154633 A1 | 10/2002 | Shin | |
| 2002/0159246 A1 | 10/2002 | Murasko et al. | |
| 2002/0186133 A1 | 12/2002 | Loof | |
| 2002/0190845 A1 | 12/2002 | Moore | |
| 2003/0029918 A1 | 2/2003 | Leanheart et al. | |
| 2003/0034985 A1 | 2/2003 | Needham Riddle | |
| 2003/0115096 A1 | 6/2003 | Reynolds | |
| 2004/0012486 A1 | 1/2004 | Mani | |
| 2004/0183742 A1 | 9/2004 | Goff et al. | |
| 2004/0220860 A1 | 11/2004 | Persky et al. | |
| 2005/0017071 A1 | 1/2005 | Noonan | |
| 2005/0186902 A1 | 8/2005 | Lieffort et al. | |
| 2005/0207823 A1 | 9/2005 | Adams et al. | |
| 2005/0280631 A1 | 12/2005 | Wong et al. | |
| 2006/0028822 A1 | 2/2006 | Tanamachi | |
| 2006/0032926 A1 | 2/2006 | Baba et al. | |
| 2006/0066453 A1 | 3/2006 | Homanfar et al. | |
| 2006/0071778 A1 | 4/2006 | Vesikivi et al. | |
| 2006/0080819 A1 * | 4/2006 | McAllister | G06K 17/00 29/403.3 |
| 2006/0090384 A1 | 5/2006 | Woodruff | |
| 2006/0160488 A1 | 7/2006 | Sueoka et al. | |
| 2006/0214794 A1 | 9/2006 | Wang | |
| 2006/0215958 A1 | 9/2006 | Yeo | |
| 2006/0230276 A1 * | 10/2006 | Nochta | G07F 7/08 713/176 |
| 2006/0261938 A1 | 11/2006 | Lai | |
| 2006/0261950 A1 | 11/2006 | Arneson et al. | |
| 2006/0266824 A1 | 11/2006 | Hassenbuerger | |
| 2006/0273176 A1 | 12/2006 | Audebert et al. | |
| 2006/0290501 A1 | 12/2006 | Hammad et al. | |
| 2006/0293956 A1 | 12/2006 | Walker et al. | |
| 2007/0008140 A1 | 1/2007 | Saarisalo et al. | |
| 2007/0013479 A1 | 1/2007 | Goel et al. | |
| 2007/0022294 A1 * | 1/2007 | Lapstun | G06F 3/03545 713/176 |
| 2007/0029384 A1 | 2/2007 | Atherton | |
| 2007/0029939 A1 | 2/2007 | Burkum et al. | |
| 2007/0056871 A1 | 3/2007 | Griffiths | |
| 2007/0057791 A1 | 3/2007 | Karjoth et al. | |
| 2007/0075145 A1 | 4/2007 | Arendonk et al. | |
| 2007/0090954 A1 | 4/2007 | Mahaffey | |
| 2007/0120772 A1 | 5/2007 | Kim et al. | |
| 2007/0135112 A1 | 6/2007 | Lessing | |
| 2007/0145152 A1 | 6/2007 | Jogand-Coulomb et al. | |
| 2007/0188483 A1 | 8/2007 | Bonner | |
| 2007/0194879 A1 * | 8/2007 | Backes | G06K 7/0008 340/5.8 |
| 2007/0215685 A1 | 9/2007 | Self | |
| 2007/0229250 A1 | 10/2007 | Recker | |
| 2007/0273951 A1 | 11/2007 | Ribi | |
| 2007/0274242 A1 | 11/2007 | Lamacraft et al. | |
| 2008/0022160 A1 * | 1/2008 | Chakraborty | G06F 21/56 714/100 |
| 2008/0040845 A1 | 2/2008 | Shoshan | |
| 2008/0064346 A1 | 3/2008 | Charrat | |
| 2008/0079582 A1 | 4/2008 | Alexis et al. | |

(56) References Cited

U.S. PATENT DOCUMENTS

| | | |
|---|---|---|
| 2008/0094854 A1 | 4/2008 | Coleman |
| 2008/0100443 A1* | 5/2008 | Grunwald .......... H04L 63/0492 340/572.1 |
| 2008/0101400 A1 | 5/2008 | Auterinen |
| 2008/0117047 A1 | 5/2008 | Collins et al. |
| 2008/0132167 A1 | 6/2008 | Bent et al. |
| 2008/0136647 A1 | 6/2008 | Brown |
| 2008/0146148 A1 | 6/2008 | Hulvey |
| 2008/0150719 A1 | 6/2008 | Cote et al. |
| 2008/0162154 A1 | 7/2008 | Fein et al. |
| 2008/0183581 A1 | 7/2008 | Philippe Coppolani |
| 2008/0191878 A1 | 8/2008 | Abraham |
| 2008/0192932 A1 | 8/2008 | Graeber et al. |
| 2008/0219227 A1 | 9/2008 | Michaelis |
| 2008/0238610 A1 | 10/2008 | Rosenberg |
| 2008/0238706 A1 | 10/2008 | Kenwright |
| 2008/0248815 A1 | 10/2008 | Busch |
| 2008/0251582 A1 | 10/2008 | Nguyen |
| 2008/0255960 A1 | 10/2008 | Nguyen |
| 2008/0258875 A1 | 10/2008 | Jesrne et al. |
| 2008/0262928 A1 | 10/2008 | Michaelis |
| 2008/0276507 A1 | 11/2008 | Hines |
| 2008/0300985 A1 | 12/2008 | Shamp et al. |
| 2008/0309463 A1 | 12/2008 | Godzwon et al. |
| 2009/0081943 A1 | 3/2009 | Dobyns et al. |
| 2009/0085746 A1 | 4/2009 | Ericikson et al. |
| 2009/0088077 A1 | 4/2009 | Brown et al. |
| 2009/0088229 A1 | 4/2009 | Hammad et al. |
| 2009/0102748 A1 | 4/2009 | Stoyer et al. |
| 2009/0115614 A1 | 5/2009 | Bertin |
| 2009/0118006 A1* | 5/2009 | Kelly .................... G07F 17/32 463/31 |
| 2009/0146814 A1 | 6/2009 | Hammad et al. |
| 2009/0168441 A1 | 7/2009 | Lin |
| 2009/0174556 A1* | 7/2009 | Horne .............. G06K 19/07336 340/572.3 |
| 2009/0189816 A1 | 7/2009 | Nikiti |
| 2009/0192937 A1 | 7/2009 | Griffin et al. |
| 2009/0193500 A1 | 7/2009 | Griffin |
| 2009/0197551 A1 | 8/2009 | Paraskake |
| 2009/0212919 A1 | 8/2009 | Selgrath et al. |
| 2009/0221240 A1 | 9/2009 | Zhang |
| 2009/0257242 A1 | 10/2009 | Wendman |
| 2009/0258678 A1 | 10/2009 | Chava et al. |
| 2009/0282859 A1 | 11/2009 | Glielmo et al. |
| 2009/0292816 A1 | 11/2009 | Etchegoyen |
| 2009/0297157 A1 | 12/2009 | Nakagawa |
| 2009/0315670 A1 | 12/2009 | Naressi |
| 2010/0009627 A1 | 1/2010 | Huomo |
| 2010/0012715 A1 | 1/2010 | Williams et al. |
| 2010/0026464 A1 | 2/2010 | Graeber |
| 2010/0030636 A1 | 2/2010 | Vijayshankar et al. |
| 2010/0046198 A1 | 2/2010 | Hoffman |
| 2010/0066508 A1 | 3/2010 | Jokinen et al. |
| 2010/0066561 A1 | 3/2010 | Ulrich et al. |
| 2010/0075666 A1 | 3/2010 | Garner |
| 2010/0079416 A1 | 4/2010 | Chung et al. |
| 2010/0082444 A1 | 4/2010 | Lin et al. |
| 2010/0082485 A1 | 4/2010 | Lin |
| 2010/0085774 A1 | 4/2010 | Park |
| 2010/0107463 A1 | 5/2010 | Spiro |
| 2010/0123553 A1 | 5/2010 | Banerjee et al. |
| 2010/0141452 A1 | 6/2010 | Lian et al. |
| 2010/0148964 A1* | 6/2010 | Broer ................ G06K 7/10356 340/572.1 |
| 2010/0148965 A1 | 6/2010 | Alexis et al. |
| 2010/0161410 A1 | 6/2010 | Tulloch |
| 2010/0161434 A1 | 6/2010 | Herwig et al. |
| 2010/0172149 A1 | 7/2010 | Siemiet |
| 2010/0174599 A1 | 7/2010 | Rosenblatt et al. |
| 2010/0176971 A1 | 7/2010 | Banerjee et al. |
| 2010/0188842 A1 | 7/2010 | Yohananoff |
| 2010/0211431 A1 | 8/2010 | Lutnick et al. |
| 2010/0216396 A1 | 8/2010 | Fernandez et al. |
| 2010/0217709 A1 | 8/2010 | Aabye |
| 2010/0221999 A1 | 9/2010 | Braun et al. |
| 2010/0231362 A1 | 9/2010 | Smith et al. |
| 2010/0241494 A1 | 9/2010 | Kumar et al. |
| 2010/0255865 A1 | 10/2010 | Karmarkar |
| 2010/0262449 A1 | 10/2010 | Monteforte et al. |
| 2010/0265041 A1 | 10/2010 | Almog et al. |
| 2010/0269383 A1 | 10/2010 | Nifenecker |
| 2010/0271839 A1 | 10/2010 | Chan |
| 2010/0274859 A1 | 10/2010 | Bucuk |
| 2010/0275265 A1 | 10/2010 | Fiske |
| 2010/0282849 A1 | 11/2010 | Mair |
| 2010/0290251 A1 | 11/2010 | Wang |
| 2010/0294835 A1 | 11/2010 | Bam et al. |
| 2010/0303230 A1 | 12/2010 | Taveau |
| 2010/0306076 A1 | 12/2010 | Taveau |
| 2010/0306819 A1 | 12/2010 | Nahari |
| 2010/0311326 A1 | 12/2010 | Klabunde et al. |
| 2011/0000971 A1 | 1/2011 | Onderko |
| 2011/0047463 A1 | 2/2011 | Shepherd et al. |
| 2011/0047759 A1 | 3/2011 | Reiter |
| 2011/0065383 A1* | 3/2011 | Frankland .............. H01Q 7/00 455/41.1 |
| 2011/0084814 A1 | 4/2011 | Ramsch |
| 2011/0112918 A1 | 5/2011 | Mestré |
| 2011/0112920 A1 | 5/2011 | Mestré |
| 2011/0114735 A1 | 5/2011 | Ziai et al. |
| 2011/0149596 A1 | 6/2011 | Lv et al. |
| 2011/0156640 A1* | 6/2011 | Moshfeghi .............. H02J 50/20 320/108 |
| 2011/0165859 A1 | 7/2011 | Wengrovitz |
| 2011/0185607 A1* | 8/2011 | Forster .................... G09F 13/04 40/452 |
| 2011/0187558 A1 | 8/2011 | Serex |
| 2011/0191478 A1 | 8/2011 | Eischeid et al. |
| 2011/0195748 A1 | 8/2011 | Main et al. |
| 2011/0211344 A1 | 9/2011 | Harbers |
| 2011/0225421 A1 | 9/2011 | Han et al. |
| 2011/0227487 A1 | 9/2011 | Nichol |
| 2011/0227507 A1 | 9/2011 | Salm |
| 2011/0228517 A1 | 9/2011 | Kawabat |
| 2011/0234379 A1 | 9/2011 | Sang Hoon Lee |
| 2011/0235318 A1 | 9/2011 | Simon |
| 2011/0238995 A1 | 9/2011 | Blanco |
| 2011/0258443 A1 | 10/2011 | Barry |
| 2011/0276961 A1 | 11/2011 | Johansson et al. |
| 2011/0287718 A1 | 11/2011 | Abel |
| 2011/0295108 A1* | 12/2011 | Cox ...................... A61B 5/042 600/424 |
| 2011/0307309 A1 | 12/2011 | Forster |
| 2011/0320291 A1 | 12/2011 | Coon |
| 2011/0320314 A1 | 12/2011 | Brown |
| 2011/0320345 A1 | 12/2011 | Taveau |
| 2012/0001725 A1 | 1/2012 | Chen |
| 2012/0013448 A1 | 1/2012 | Baranowski |
| 2012/0024951 A1 | 2/2012 | Graeber |
| 2012/0029990 A1 | 2/2012 | Fisher |
| 2012/0032632 A1 | 2/2012 | Soar |
| 2012/0039472 A1 | 2/2012 | Liu |
| 2012/0059741 A1 | 3/2012 | Khan et al. |
| 2012/0061465 A1 | 3/2012 | Luo |
| 2012/0072979 A1 | 3/2012 | Cha |
| 2012/0075148 A1 | 3/2012 | Cho |
| 2012/0083205 A1 | 4/2012 | Marcu et al. |
| 2012/0089845 A1 | 4/2012 | Raleigh |
| 2012/0126700 A1 | 5/2012 | Mayfield et al. |
| 2012/0154633 A1 | 6/2012 | Rodriguez |
| 2012/0156992 A1 | 6/2012 | Walker et al. |
| 2012/0218084 A1 | 8/2012 | Arponen et al. |
| 2012/0253974 A1 | 10/2012 | Haikonen et al. |
| 2012/0256494 A1* | 10/2012 | Kesler ...................... H03H 7/40 307/104 |
| 2012/0265596 A1* | 10/2012 | Mazed .................... G06Q 30/02 705/14.23 |
| 2012/0265682 A1 | 10/2012 | Menon |
| 2012/0278676 A1* | 11/2012 | Teraura ............... G06F 11/1489 714/746 |
| 2012/0309302 A1* | 12/2012 | Buhot .................. G06K 7/10237 455/41.1 |

(56) References Cited

U.S. PATENT DOCUMENTS

| | | | |
|---|---|---|---|
| 2013/0006847 A1 | 1/2013 | Hammad et al. | |
| 2013/0045679 A1* | 2/2013 | Orsatti | H04B 5/02 455/41.1 |
| 2013/0063008 A1 | 3/2013 | Martin | |
| 2013/0106576 A1* | 5/2013 | Hinman | G06K 7/10267 340/10.1 |
| 2013/0157713 A1* | 6/2013 | Stolarczyk | H04M 1/026 455/550.1 |
| 2013/0165041 A1 | 6/2013 | Bukovjan et al. | |
| 2013/0173455 A1 | 7/2013 | Adams et al. | |
| 2013/0176184 A1 | 7/2013 | Dokai et al. | |
| 2013/0309965 A1 | 11/2013 | Hillan | |
| 2013/0342323 A1* | 12/2013 | Hinman | G06K 7/10079 340/10.1 |
| 2013/0344805 A1 | 12/2013 | Lefley | |
| 2014/0009268 A1* | 1/2014 | Oshima | G08C 17/02 340/12.5 |
| 2014/0070850 A1 | 3/2014 | Darwhekar et al. | |
| 2014/0113551 A1 | 4/2014 | Krishnan et al. | |
| 2014/0145823 A1 | 5/2014 | Aase | |
| 2014/0152856 A1* | 6/2014 | Ikeda | H04N 1/00007 348/207.1 |
| 2014/0229251 A1* | 8/2014 | Lim | G06Q 30/0252 705/14.5 |
| 2014/0252083 A1* | 9/2014 | Lee | G06Q 30/0241 235/375 |
| 2015/0140929 A1* | 5/2015 | Lefley | G06K 7/0008 455/41.1 |
| 2015/0334521 A1* | 11/2015 | Lee | H04M 1/7253 455/41.1 |
| 2016/0283759 A1 | 9/2016 | Forster | |
| 2017/0012355 A1 | 1/2017 | Pachler et al. | |

FOREIGN PATENT DOCUMENTS

| | | |
|---|---|---|
| CN | 201302803 Y | 9/2009 |
| CN | 102217410 | 10/2011 |
| EP | 1127469 B1 | 7/2003 |
| EP | 1914631 | 4/2008 |
| EP | 2143991 | 1/2010 |
| EP | 1948995 | 4/2010 |
| EP | 1792272 B1 | 10/2010 |
| EP | 2237519 | 10/2010 |
| EP | 2296025 | 3/2011 |
| EP | 2309431 A1 | 4/2011 |
| EP | 2371110 | 5/2011 |
| EP | 2366937 | 9/2011 |
| FR | 2783960 | 3/2000 |
| JP | 2006011422 | 1/2006 |
| JP | 2006030882 | 2/2006 |
| JP | 2006058435 | 3/2006 |
| JP | 2006349887 | 12/2006 |
| JP | 2007034362 | 2/2007 |
| JP | 2002162918 | 6/2007 |
| KR | 20100072115 A | 6/2010 |
| WO | 2006031824 | 3/2006 |
| WO | 2006095212 | 9/2006 |
| WO | 2006098765 | 9/2006 |
| WO | 2006111782 | 10/2006 |
| WO | 2007002459 | 1/2007 |
| WO | 2007035835 | 3/2007 |
| WO | 2007064069 | 6/2007 |
| WO | 2008034937 | 3/2008 |
| WO | 2008063706 | 5/2008 |
| WO | 2008087431 | 7/2008 |
| WO | 2008132269 | 11/2008 |
| WO | WO-2008142455 A2 | 11/2008 |
| WO | 2009028203 | 3/2009 |
| WO | 2010077194 | 7/2010 |
| WO | 2010095988 | 8/2010 |
| WO | 2010148816 | 12/2010 |
| WO | 2011010970 | 1/2011 |
| WO | 2011020041 | 2/2011 |
| WO | 2011033424 | 3/2011 |
| WO | 2011053914 | 5/2011 |
| WO | 2011088190 | 7/2011 |
| WO | 2011094384 | 8/2011 |
| WO | 2011109092 | 9/2011 |
| WO | WO-2011112778 A1 | 9/2011 |
| WO | 2011121488 | 10/2011 |
| WO | 2012037255 | 3/2012 |

OTHER PUBLICATIONS

Ongtang, Machigar, et al., "Semantically Rich Application-Centric Security in Android", Security and Communication Networks, vol. 5, Issue 6, Jun. 2012, 658-673.

Becher, Michael, et al., "Mobile Security Catching Up? Revealing the Nuts and Bolts of the Security of Mobile Devices", 2011 IEEE Symposium on Security and Privacy, 96-111.

Broll, Gregor, et al., "Touch to Play—Exploring Touch-Based Mobile Interaction with Public Displays", 3rd International Workshop on Near Field Communication, Feb. 22, 2011, 15-20.

Chai, Qi, "Design and Analysis of Security Schemes for Low-cost RFID Systems", Doctor of Philosophy Thesis in Electrical and Computer Engineering, University of Waterloo, Ontario, Canada, 2012, 184 pgs.

Cheng, Hsu-Chen, et al., "A Secure and Practical Key Management Mechanism for NFC Read-Write Mode", J. Computational Information Systems, 7:11, (2011), 3819-3828.

Cheng, Jerry, et al., "SmartSiren: Virus Detection and Alert for Smartphones", MobiSys'07, Jun. 11-14, 2007, San Juan, Puerto Rico, 258-271.

Choi, Kwanghoon, et al., "A Secure Application Invocation Mechanism in Mobile Phones for Near Field Communication", 2012 IEEE International Conference on Consumer Electronics (ICCE), Jan. 2012, 731-732.

Coppolino, Luigi, et al., "A Trusted Information Agent for Security Information and Event Management", ICONS 2012: The Seventh International Conference on Systems, 6-12.

Francis, Lishoy, et al., "Practical NFC Peer-to-Peer Relay Attack Using Mobile Phones", The 6th Workshop on RFID Security (RFIDSec 2010), Istanbul, Turkey (LNCS), Jun. 7-9, 2010, 35-49.

Francis, Lishoy, et al., "Practical Relay Attack on Contactless Transactions by Using NFC Mobile Phones", In Cryptology ePrint Archive, Report 2011/618, Nov. 2011, 16 pgs.

Hancke, G. P., et al., "Security Challenges for User-Oriented RFID Applications within the 'Internet of Things'", J. Internet Technology, vol. 11, No. 3, 2010, 307-313.

Hardy, Robert, et al., "Touch & Interact: Touch-based Interaction of Mobile Phones with Displays", MobileHCI 2008, Proc. 10th international conference on Human computer interaction with mobile devices and services, 245-254.

Haselsteiner, Ernst, et al., "Security in Near Field Communication (NFC): Strengths and Weaknesses", Proceedings of the Workshop on RFID Security (RFIDSec), Graz, Austria, Jul. 12-14, 2006, 11 pgs.

Husni, Emir, et al., "Efficient Tag-to-Tag Near Field Communication (NFC) Protocol for Secure Mobile Payment", 2nd International Conference on Instrumentation, Communications, Information Technology, and Biomedical Engineering (ICICI-BME), Bandung, Indonesia, Nov. 8-9, 2011, 97-101.

Juels, Ari, et al., "The Blocker Tag: Selective Blocking of RFID Tags for Consumer Privacy", 8th ACM Conference on Computer and Communications Security, 103-111, ACM Press, 2003.

Kazmi, Hammad Raza, "Security and Privacy Issues in Near Field Communication (NFC) Systems",Master Thesis, Royal Institute of Technology, Sweden, Apr. 2011, 59 pgs.

Kfir, Ziv, et al., "Picking Virtual Pockets using Relay Attacks on Contactless Smartcard Systems", Proceeding of the First International Conference on Security and Privacy for Emerging Areas in Communications Networks, Sep. 5-9, 2005, 47-58.

Kortvedt, Henning Siitonen, "Securing Near Field Communication", Norwegian University of Science and Technology, Dept. of Telematics, Master Thesis, Jun. 2009, 135 pgs.

Kuppusamy, K. S., et al., "A Model for Remote Access and Protection of Smartphones Using Short Message Service", Interna-

(56) References Cited

OTHER PUBLICATIONS tional J. Computer Science, Engineering and Information Technology (IJCSEIT), vol. 2, No. 1, (Feb. 2012), 91-100.
Long, Men, et al., "Human Perceivable Authentication: An Economical Solution for Security Associations in Short-Distance Wireless Networking", Proceedings of 16th International Conference on Computer Communications and Networks, Aug. 13-16, 2007, 257-264.
Madlmayr, Gerald, et al., "NFC Devices: Security & Privacy", Proceedings of the 3rd International Conference on Availability, Reliability and Security, Barcelona, Spain, Mar. 7, 2008, 13 pgs.
Mulliner, Collin, "Attacking NFC Mobile Phones", 25th Chaos Communication Congress, Berlin, Germany, Dec. 2008, 71 pgs.
Mulliner, Collin, "Vulnerability Analysis and Attacks on NFC-enabled Mobile Phones", 2009 International Conference on Availability, Reliability and Security, Fukuoka, Japan, Mar. 16-19, 2009, 695-700.
Anonymous, "Near-field communications will be standard technology for mobiles", Electronics Weekly, (Feb. 21, 2007), p. 8.
"NFC Record Type Definition (RTD)", Technical Specification NFC Forum, RTD 1.0, NFCForum-TS-RTD_1.0, (Jul. 24, 2006), 20 pgs.
Opoku, Samuel King, "Performance Enhancement of Large-Size NFC Multi-Touch System", Cyber Journals: Multidisciplinary Journals in Science and Technology, Journal of Selected Areas in Telecommunications (JSAT), (Oct. 2011), 52-57.
"Radio Frequency Identification (RFID): A Focus on Information Security and Privacy", OECD Digital Economy Papers, No. 138, Jan. 14, 2008, 11-81.
Rahnama, Behnam, et al., "Securing RFID-Based Authentication Systems Using ParseKey+", Proceedings of the 3rd International Conference on Security of Information and Networks, Taganrog, Russia, Sep. 7-11, 2010, 212-217.
Roland, Michael, et al., "Digital Signature Records for the NFC Data Exchange Format", Second International Workshop on Near Field Communication, Monaco, Apr. 20, 2010, 71-76.
Roland, Michael, et al., "Security Vulnerabilities of the NDEF Signature Record Type", 2011 Third International Workshop on Near Field Communication, Hagenberg, Austria, Feb. 22, 2011, 65-70.
Rose, Chris, "Close Contact: An Examination of the Future of Near Field Communications", International J. Management & Information Systems, First Quarter 2012, vol. 16, No. 1, 95-100.
"South Korea Telecommunications Report Included BMI's Forecasts", Q2 2012, Business Monitor International Ltd., (Apr. 2012), 94 pgs.
Välkkynen, Pasi, et al., "Suggestions for Visualizing Physical Hyperlinks", PERMID 2006: Pervasive Mobile Interaction Devices—Mobile Devices as Pervasive User Interfaces and Interaction Devices, Dublin, Ireland, May 7, 2006, 245-254.
"AN1445: Antenna design guide for MFRC52x, PN51x and PN53x, Rev.1.2, Document AN1445_12", NXP B.V., (Oct. 11, 2010), 65 pgs.
"Radio-Frequency-IDentific@tion, http://rfid-handbook.com/", advertisement (Dec. 2, 2011), 5 pgs.
A Near Field Communication Tool for Building Intelligent Environment using Smart Posters, International Journal of Computers and Communications, Issue 1, vol. 4, 2010, Pilar Castro Garrido, Guillermo Matas Miraz, Irene Luque Ruiz, and Miguel Angel Gomez-Nieto.
A Pervasive Presentator—Simplifying the Task of Presenting, Lulea University of Technology; Viktor Lindgren, Mattias Lundberg, Elias Naslund, John Viklund (2012).
A System of Secure Virtual Coupons Using NFC Technology, IEEE Computer Society, CompProceedings of the Fifth Annual IEEE International Conference on Pervasive Computing and Communications Workshops 2007 (PerComW'07); Manfred Aigner, Sandra Dominikus, Martin Feldhofer.
Amato-McCoy, Deena M. Crime stoppers: by focusing their loss prevention efforts on the entire enterprise, grocers are in a better position to combat internal and external theft. Grocery Headquarters, v77, n. 11, p. 101 (3). Nov. 2011.
Application of Near Field Communication for Health Monitoring in Daily Life; Esko Strommer, Jouni Kaartenen, Juha Parkka, Arto Ylisauko-oja, Ilkka Korhonen; Proceedings of the 28th IEEE EMBS Annual International Conference New York City, USA, Aug. 30-Sep. 3, 2006.
Bauer-Reich,C., et al. "Low-profile, high-permeability antennaless RFID tags for use on metal objects", Proceedings of the 2012 IEEE International Workshop on Antenna Technology (iWAT), (Mar. 5-7, 2012), 32-35.
Bling: NFC Arrives in U.S., Sam Churchill, Oct. 27, 2010, http://www.dailywireless.org/2010/10/27/bling-nfc-arrives-in-u-s/.
Bovelli, S., "A Novel Antenna Design for Passive RFID Transponders on Metal Surfaces", Proceedings of the 36th European Microwave Conference, Manchester, UK (Sep. 2006), 580-582.
Cavoukian, A., "Mobile Near Field Communications (NFC)—"Tap'n Go"—Keep it Secure & Private", Information and Privacy Commissioner, Ontario, Canada / Privacy by Design (Nov. 2011), 22 pgs.
Christian Metzger et al: "Making Radio Frequency Indentificaiton Visible—A Watchdog Tag", Fifth Annual IEEE International Conference on pervasive computing and communications workshops, Mar. 19-23, 2007.
Christianson, B., et al. (eds.), "Security Protocols", 13th International Workshop, Revised Selected Papers, Cambridge, UK, (Apr. 20-22, 2005), Lecture Notes in Computer Science, 4631, Springer-Verlag, Berlin, 354 pgs.
Cole, P.H., et al., Networked RFID Systems and Lightweight Cryptography: Raising Barriers to Product Counterfeiting, First Edition, Springer-Verlag, Berlin (2003), 350 pgs.
Connecting the Mobile Phone with the Internet of Things—Benefits of EPC and NFC Compatibility; Thomas J.P. Wiechert, Florian Michahelles, 2007.
Do you talk to each poster? Security and Privacy for Interactions with Web Service by means of Contact Free Tag Readings, Peter Schoo, Massimo Paolucci, Feb. 24, 2009 First International Workshop on Near Field Communication.
Dodson, B., et al., "Micro-Interactions with NFC-Enabled Mobile Phones", Proceedings of the Third International Conference on Mobile Computing, Applications, and Services (MobiCASE), Los Angeles, CA, Oct. 2011. Retrieved from the Internet: <URL: http://mobisocial.stanford.edu/papers/mobicase11.pdf >, 20 pgs.
Elliptic Curve Certificates and Signatures for NFC Signature Records, Reasearch in Motion, Certicom Research, Jan. 1, 2011, Tony Rosati, Greg Zaverucha.
Enabling RFID in Retail, George Roussos, Birkbeck, University of London, IEEE Computer Society, Mar. 2006.
Encrypted NFC emergency tags based on the German Telematics Infrastructure, 2011 Third International Workshop on Near Field Communication, Sebastian Dunnebeil, Felix Kobler, Philip Koene, Helmut Kremar, Jan Marco Leimeister.
Enhancing Authentication in eBanking with NFC enabled mobile phones, Aug. 11, 2008, Diego Alejandro Ortiz-Yepes.
Enhancing Security and Usability Features of NFC, 2009; Beygo, Omer Kerem; Eraslan, Cihan.
European Search Report dated Nov. 25, 2016 for European Application No. EP16002075 filed Sep. 26, 2016.
Finkenzeller, K., "Known attacks on RFID systems, possible countermeasures and upcoming standardization activities", presentation slides, RFID—Systech, Bremen, Germany, Jun. 2009. Retrieved from the Internet: <URL: http://rfidhandbook. de/downloads/Finkenzeller_Systech-Bremen-2009_v1.0.pdf>, 31 pgs.
Gebhart, M, et al., "Design of 13.56 MHz Smartcard Stickers with Ferrite for Payment and Authentication", Proceedings of the 2011 3rd International Workshop on Near Field Communication (NFC), Feb. 21-22, 2011. Retrieved from the Internet: <URL: https://online.tugraz.at/tug_online/voe_main2.getVollText?pDocumentNr=202812&pCurrPk=59398>, 6 pgs.
Ghanname, Taoufik. How NFC can to speed Bluetooth transactions—today. Eetimes. Feb. 14, 2006. Retrieved at http://eetimes.com/General/PrintView/4012606.

(56) References Cited

OTHER PUBLICATIONS

Hancke, G.P., "Practical Eavesdropping and Skimming Attacks on High-Frequency RFID Tokens", Preprint version of article published in Journal of Computer Security. vol. 19, Issue 2. (Jun. 2010). Retrieved from the Internet: <URL: http://www.rfidblog.org.uk/Hancke-JoCSSpecialRFIDJune2010.pdf>, 23 pgs.
Hancke, G.P., "Security of proximity identification systems", Technical Report, No. 752, University of Cambridge Computer Laboratory, UK (Jul. 2009), 161 pgs.
Hend S. Al-Khalifa: "Utilizing QR Code and Mobile Phones for Blinds and Visually Impaired People", copyright 2008.
Hinske, S., et al., "RFIDice—Augmenting Tabletop Dice with RFID", Journal of Virtual Reality and Broadcasting, vol. 5, No. 4, (2008), 12 pgs.
International Preliminary Report on Patentability and Written Opinion dated Apr. 21, 2015 for International Application PCT/US13/031448 filed Mar. 14, 2013.
International Preliminary Report on Patentability and Written Opinion dated Jul. 31, 2012 for International Application PCT/US11/022680 filed Jan. 27, 2011.
International Preliminary Report on Patentability and Written Opinion dated Jul. 31, 2012 for International Application PCT/US11/022687 filed Jan. 27, 2011.
International Preliminary Report on Patentability and Written Opinion dated Mar. 4, 2014 for International Application PCT/US12/053322 filed Aug. 31, 2012.
International Preliminary Report on Patentability and Written Opinion dated Mar. 10, 2015 for International Application PCT/US12/031136 filed Mar. 14, 2013.
International Preliminary Report on Patentability and Written Opinion dated May 19, 2015 for International Application PCT/US12/031131 filed Mar. 14, 2013.
International Search Report dated Aug. 20, 2013 for International Application PCT/US13/031131 filed Mar. 14, 2013.
International Search Report dated Aug. 6, 2013 for International Application PCT/US13/031448 filed Mar. 14, 2013.
International Search Report dated Mar. 11, 2011 for International Application PCT/US11/022687 filed Jan. 27, 2011.
International Search Report dated Mar. 8, 2011 for International Application PCT/US11/022680 filed Jan. 27, 2011.
International Search Report dated May 22, 2013 for International Application PCT/US12/031136 filed Mar. 14, 2013.
International Search Report dated Nov. 21, 2012 for International Application PCT/US12/053322 filed Aug. 31, 2012.
Johansson, B., "An Introduction to RFID—Information Security and Privacy Concerns", TDDC03 Projects, (Spring 2004), 14 pgs.
Jung, M, et al., "All-Printed and Roll-to-Roll Printable 13.56-MHz-Operated 1-bit RF Tag on Plastic Foils", IEEE Transactions on Electron Devices, (Feb. 19, 2010), 10 pgs.
Kuo, S., "A performance evaluation method for EMI sheet of metal mountable HR RFID tag", Measurement, 44 (2011), 946-953.
LocaTag—An NFC-based system enhancing instant messaging tools with real-time user location; Kobler, Philip Koene, Helmut Kremar, Matthias Altmann, Jan Marco Leimeister, Apr. 20, 2010 Second International Workshop on Near Field Communication.
Location-Triggered Code Execution-Dismissing Displays and Keypads for Mobile Interaction; W. Narzt and H. Schmitzberger, C. Stephanidis (Ed.): Universal Access in HCI, Part II, HCII 2009, LNCS 5615, pp. 374-383, 2009. © Springer-Verlag Berlin Heidelberg 2009.
Media Clips: Implementation of an Intuitive Media Linker; Seunghyun Yoon, Kyuyun Lee, Hyunchang Shin, Samsung Electronics, 2011 IEEE International Symposium on Broadband Multimedia Systems and Broadcasting (BMSB) held Jun. 8-10, 2011.
Mitrokotsa, A., et al., "Classification of RFID Attacks", Proceedings of the 2nd International Workshop on RFID Technology—Concepts, Applications, Challenges (IWRT 2008), in conjunction with the 10th International Conference on Enterprise Information Systems, pp. 73-86, Barcelona, Spain, Jun. 2008. INSTICC Press, Portugal. Retrieved from the Internet: <URL: http://www.cs.vu.nl/~ast/publications/iwrt-2008.pdf>.
Mobile Personal Devices meet Situated Public Displays: Synergies and Opportunities; Alan Dix, Corina Sas (2010). International Journal of Ubiquitous Computing (IJUC), 1(1), pp. 11-28. http://www.hcibook.com/alan/papers/MPD-SPD-2010/.
Near Field Communication in Smartphones, Simon Burkard, Berlin Institute of Technology, Germany, 2012.
Near Field Communications Handbook, vol. 13 of Internet and Communications, 2009; Mohammad Ilyas.
Newport Digital Technologies to Implement Microsoft Licensing Agreement; Prepares to Launch First Ruggedized RFID Reader with Windows Mobile Operating System. Business Wire Oct. 20, 2009.
NFC and Mobile Payments Today, Andre Filipe de Axevedo Figueiredo Cruz, Nov. 2011.
NFC Data Exchange Format (NDEF), Technical Specification, NDEF 1.0, Jul. 24, 2006.
NFC Forum Type Tags, White Paper V1.0, Apr. 1, 2009—Public.
NFC Mobile Parlor Games Enabling Direct Player to Player Interaction, 2011 Third International Workshop on Near Field Communication, Avinash Nandwani, Paul Coulton, Reuben Edwards.
NFC-Based Mobile Interactions with Direct-View Displays; Khoovirajsingh Seewoonauth, Enrico Rukzio, Robert Hardy, and Paul Holleis, IFIP Conference on Human-Computer Interaction—INTERACT 2009 pp. 835-838.
NFC-CAP Securty Assessment, vol. 1.0—May 11, 2009; Diego A. Ortiz-Yepes.
Oren, Y., "Attacks on RFID-Based Electronic Voting System", Cryptology ePrint Archive Report 2009/442 (2009). Retrieved from the Internet: <URL: http://eprint.iacr.org/2009/422.pdf>, 21 pgs.
Physical browsing with NFC technology; Heikki Ailisto, Tapio Matinmikko, Juha Haikio, Arto Ylisaukko-oja, Esko Strommer, Mika Hillukkala, Arto Wallin, Erkki Siira, Aki Poyry, Vili Tormanen, Tua Huomo, Tuomo Tuikka, Sonja Leskinen & Jarno Salonen, Espoo May 2007. VTT Tiedotteita—Research Notes 2400.
Programming Android; Zigurd Mednieks, Laird Domin, G. Blake Meike, Masumi Nakamura, O'Reilly Media, Inc., 2011, http://books.google.co.in/books?id=5BGBswAQSiEC&lpg=PR5&ots=xSfgivFwS&dq=rogue%20NFC%20active%20tags%20url%20phone%20peer%20to%20peer&lr&pg=PA397#.
QR Code Tech Info: MECARD Format, May 2, 2011.
QRFactory, Redirectable QR, http://dashboard.qrfactory.com/, pulled from the internet Apr. 27, 2012.
RFID based applications in culture, media and creative industries, 2011 Third International Workshop on Near Field Communication, Eileen Kuehn, Jens Reinhardt, Stephan Bergemann, Prof. Dr. Juergen Sieck.
RFID Inventory Management System. Package Printing, v57 n2, pp. 34. Feb. 2010.
Rieback, M.R., et al., "A Platform for RFID Security and Privacy Administration", Proceedings of the 20th USENIX/SAGE Large Installation System Administration conference (LISA 2006), Washington D.C., (Dec. 2006). Retrieved from the Internet: <URL: http://www.rfidguardian.org/images/a/a9/Lisa.06.pdf>, 14 pgs.
Rieback, M.R., et al., "The Evolution of RFID Security", Pervasive Computing (Jan.-Mar. 2006), 62-69.
Sabzevar, A.P., "Security in RFID Systems" Project report for GMU ECE 646 (2004). Retrieved from the Internet: <URL: http://teal.gmu.edu/courses/ECE646/project/reports_2004/SP-4_report.pdf>, 13 pgs.
Sarma, S.E., et al., "RFID Systems and Security and Privacy Implications", CHES 2002, LNCS 2523, B.S. Kaliski Jr. et al. (Eds.) (2003), pp. 454-469, 2003.
Secure contactless mobile financial services with Near Field Communication; Adeola Oluwaseyi Poroye, Aug. 2011.
Simple NDEF Exchange Protocol, Technical Specification, NFC Forum SNEP 1.0, Aug. 31, 2011.
Situated Door Displays and how to interact with them, Barbara Schmid, Jan. 16, 2012.

(56) References Cited

OTHER PUBLICATIONS

Smart Poster Record Type Definition Technical Specific MFC Forum TM SPR 1.1 NFCForum-SmartPoster_RTD_1.0, Jul. 24, 2006.
Suh, J., "Introduction to composite electromagnetic noise absorber technology" EMC Directory & Design Guide, (2007), 4 pgs.
Switching the role of NFC tag and reader for the implementation of Smart Posters, 2012 4th International Workshop on Near Field Communication; Dirk Volland, Kay Noyen, Onur Kayikei, Lukas Ackermann, Florian Michahelles.
Thamilarasu G et al: "Intrusion detection in RFID systems", Military Communications Conference, 2008, pp. 1-7.
The "Weak Spots" in Stacked UHF RFID Tags in NFC Applications, IEEE RFID 2010; Xiaosheng Chen, Feng Lu, Terry T.Ye*.
The Junction Protocol for Ad Hoc Peer-to-Peer Mobile Applications; Computer Science Department Stanford University; Ben Dodson, Aemon Cannon, Te-Yuan Huang, Monica S. Lam, Apr. 2011.
The Mobile Phone as Digital SprayCan; Philip Garner, Omer Rashid, Paul Coulton, and Reuben Edwards, Proceedings of the 2006 ACM SIGCHI international conference on Advances in computer entertainment technology Article No. 12, Hollywood, California, USA—Jun. 14-16, 2006.
Touch-driven Interaction Between Physical Space and Cyberspace with NFC, Longbio Chen, Gang Pan, Shijian Li, Department of Computer Science, Zhejiang University Hangzhou, China, 2011 IEEE International Conferences on Internet of Things, and Cyber, Physical and Social Computing.
Turcu, C. (ed.), Development and Implementation of RFID Technology, In-Teh, I-Tech Education and Publishing KG, Vienna, Austria (Feb. 2009), 564 pgs.
Type 1 Tag Operation Specification, Technical Specification, Technical Specification, NFC Forum T1TOP 1.1, Apr. 13, 2011.
Type 2 Tag Operation Specification Technical Specification, T2TOP 1.1 NFC Forum May 31, 2011.
Type 3 Tag Operation Specification, Technical Specification, Technical Specification, NFC Forum, T3TOP 1.1, Jun. 28, 2011.
Varshney, L.R., et al.., "Securing Inductively-Coupled Communication", Information Theory and Applications Workshop (ITA) (Feb. 5-10, 2012), 6 pgs.
Vidano, R., "13.56-MHz Inductively Coupled Card Compatibility to Conducting Surfaces", Proceedings of Asia-Pacific Microwave Conference (2007), 4 pgs.
Violino, Bob. A Summary of RFID Standards. RFID Standards. RFID Journal. Jan. 16, 2005. URL at http://www.rfidjournal.com/articles/view?135.
Wang, J.J.H., "Spiral Antennas in RFID and Their Size Reduction and Performance Enhancement", 2007 IEEE International Workshop on Anti-counterfeiting, Security, Identification (Apr. 16-18, 2007), 44-47.
Wegleiter, H. et al., "Automatic Antenna Tuning Unit to Improve RFID System Performance", IEEE Transactions on Instrumentation and Measurement, vol. 60, No. 8,(Aug. 2011), 2797-2803.
Weis, Stephen A, "Security and Privacy Aspects of Low-Cost Radio Frequency Identification Systems", Security in Pervasive Computing 2003, LNCS 2802, D. Flutter et al. (Eds.) (2004) 201-212.
Yamada, I., et al., "Secure Active RFID Tag System", Ubicomp2005 Workshops, 5 pgs.
Zhu, H., et al., "Solutions of Metal Surface Effect for HF RFID Systems", 2007 International Conference on Wireless Communications, Networking and Mobile Computing (WiCom), (Sep. 21-25, 2007), 2089-2092.

* cited by examiner

METHOD, SYSTEM AND APPARATUS FOR NFC SECURITY

CROSS-REFERENCE TO RELATED APPLICATION

The present application claims the benefit of U.S. Provisional Patent Application No. 61/715,426 filed Oct. 18, 2012, which is incorporated herein by reference in its entirety.

BACKGROUND OF THE INVENTION

Radio frequency identification (RFID) devices, including near field communication (NFC) enabled RFID devices, are utilized for a variety of purposes. Often such devices are formed as tags or labels and can be utilized to associate an object with an identification code or other data, such as website data. Such RFID devices may be passive and, upon receiving a signal, such as an excitation signal from an RFID or NFC-enabled reader, may be energized. The devices can then respond with a desired communication or provide information associated with a product, item or service associated with the RFID device.

Specifically, NFC is a data exchange protocol designed to allow devices, including suitably equipped mobile phones and the like, to interact with infrastructures, such as point of sale terminals and ticket gates on transportation systems, or RFID devices in the forms of "smart posters" or "touchpoints", for example. In such situations, bringing an NFC enabled device into proximity of such infrastructure or RFID devices can cause the transmission of data to the NFC enabled device, resulting in, for example, the opening of a web page, the acceptance of a media stream via Bluetooth® or any of a number of other functions.

Often the manner of associating a product, item or service with an RFID device is to physically couple or adhere the RFID device to the product or item, or associate it with advertising relating to the product, item or service, such as the "smart poster" or "touchpoint" described above. For example, RFID labels may be coupled adhesively to objects or may otherwise have surfaces that attach directly to objects. RFID tags may be secured to objects in other manners, such as through the use of a plastic fastener, string or other fastening mechanism. Such RFID devices may then provide data to NFC enabled devices located or placed proximate the RFID devices.

Additionally, RFID devices are often associated with the product or item, or advertising item, in such a manner as to conceal or secure the RFID device. Such methods can provide security against the removal or misuse of an RFID device. However, in such circumstances, and particularly with NFC enabled devices designed to convey information to consumers with NFC enabled mobile phones and devices, there is a designated area (touchpoint) on an advertisement or product that indicates information can be obtained if the NFC enabled device is placed in close proximity to an area associated with the RFID device. However, as it is then known that information can be obtained from such areas, vandal or pirate RFID devices are often placed in close proximity to the indicated NFC area. The vandal or pirate devices often contain deceptive, misleading, undesired or malicious information. These devices can be coupled with or adhered to products and items, or advertisements associated with those items, leading to inappropriate or malicious information being unknowingly communicated to a user's NFC-enabled device. The current invention provides a possible solution to this problem.

SUMMARY

A method, system and apparatus for providing security to RFID and NFC systems. In some exemplary embodiments, a smart poster may be utilized to provide appropriate or desired communications with an RFID or NFC-enabled device. Such exemplary embodiments may utilize an authorized NFC tag to communicate with an NFC-enabled device, and upon activation of the authorized NFC tag, may trigger activation or appearance of one or more related items, such as visual cues. Additionally, aspects of NFC security systems which can include regions of security, states of activity and actions performed when security violations are detected.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Figure 1:
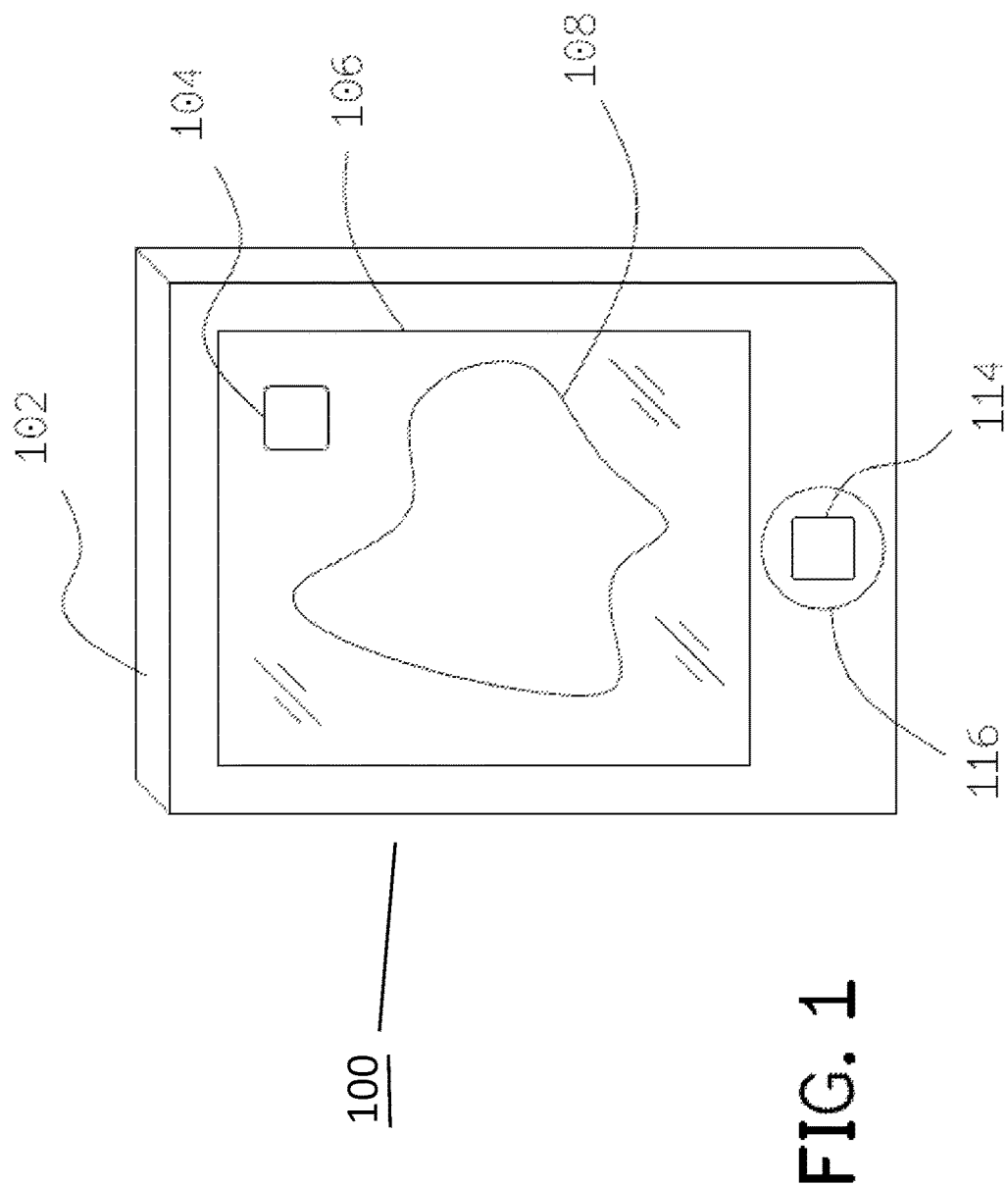
FIG. 1 is an exemplary view of a poster with an embedded RFID device.
Figure 2:
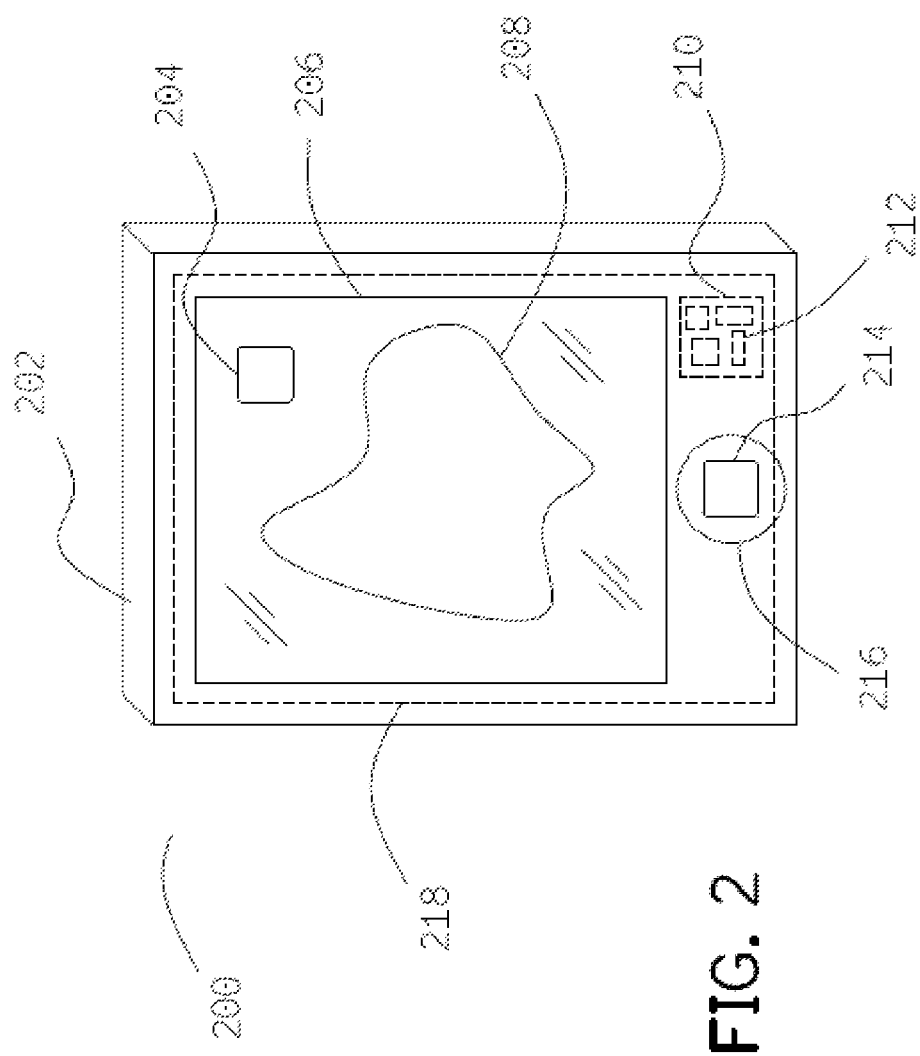
FIG. 2 is an exemplary view of a poster with an embedded RFID device and a security system.
Figure 3:
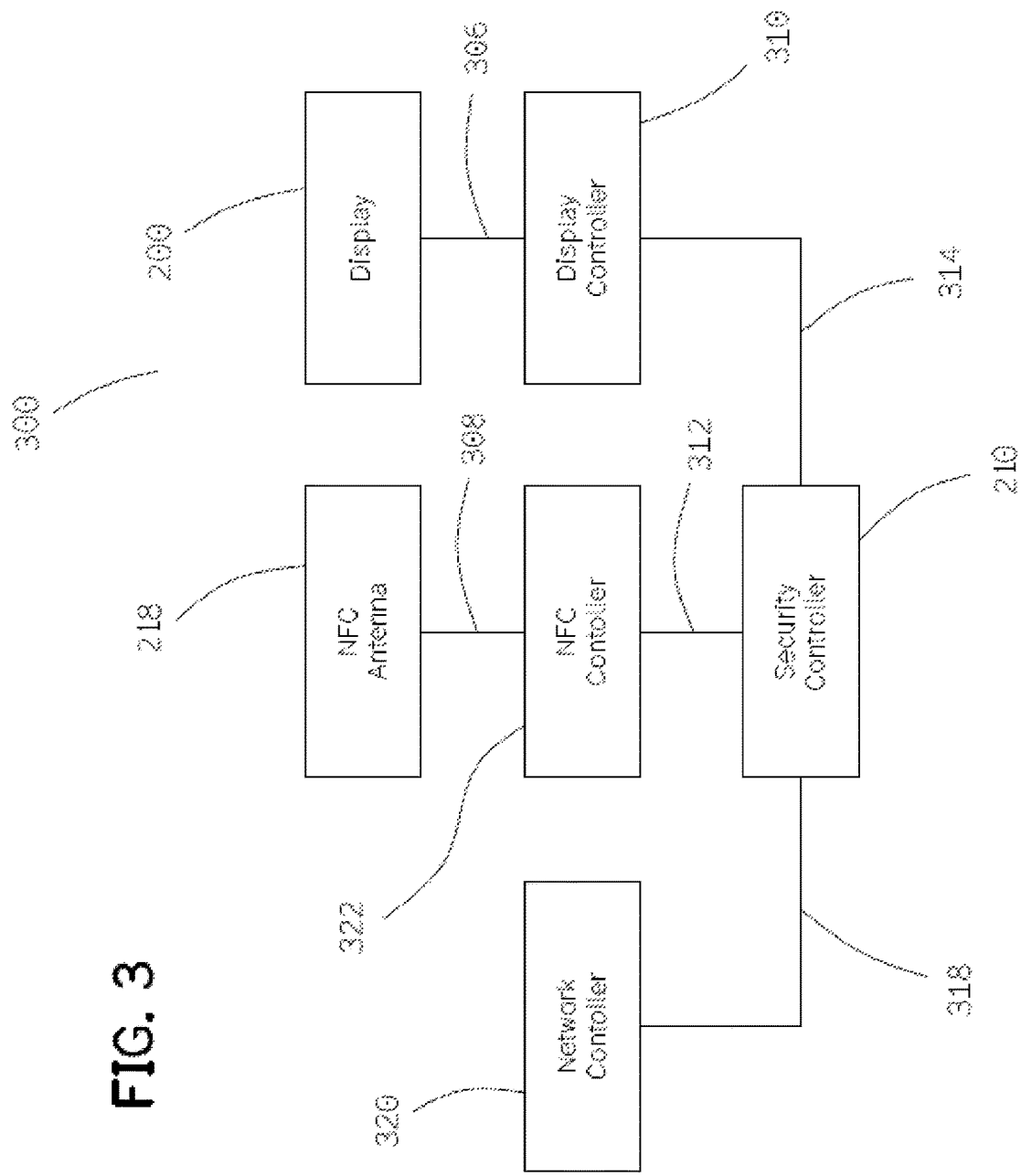
FIG. 3 is an exemplary diagram showing a security system that may be used with an RFID device.

Generally referring to FIGS. 1-3, a smart poster, such as a poster that incorporates an authorized RFID device, including an authorized NFC tag, may be utilized to provide appropriate or desired communications with an RFID or NFC-enabled device. Such exemplary embodiments may utilize an authorized NFC tag to communicate with an NFC-enabled device, and upon activation of the authorized NFC tag, may trigger activation or appearance of one or more related items, such as visual cues. Additionally, aspects of NFC security systems which can include regions of security, states of activity and actions performed when security violations are detected. Additionally, while some of the exemplary embodiments described discuss either RFID or NFC communication capabilities, it may be appreciated that such capabilities may be embodied in the same device or such capabilities may be used interchangeably in some instances.

Referring now to exemplary FIG. 1, a view of a display 100 having a poster 106 with a supporting frame 102 is provided. In the exemplary embodiment, poster 106 may be any type of poster, formed of any type of material, and may be utilized to convey any type of information. The poster can be formed from any acceptable material, including but not limited to paper, foils and plastic/films. The information conveyed can be any desired type, including, but not limited to, advertisements, personal care, health care and product or service information. The structural frame 102 can provide a secure containment of poster 106, an authorized communication device, such as authorized NFC tag 114 and desired related components or electronics, such as, but not limited to, lighting and an NFC security system. Frame 102 may be any type of desired frame and may be formed out of any desired materials. Additionally, frame 102 may be such that it can be formed with an integral antenna or may be retrofitted with an antenna.

In FIG. 1, the exemplary poster 106 may contain visual information 108, for example an advertisement for a product or any other desired visual information. Additionally, NFC tag 114 may be provided with a visual indicator 116 associated therewith. The visual indicator 116 may be any type of static or electronic visual indicator and may be used, for example, to guide user to an appropriate region to place NFC-enabled devices that can read the authorized NFC tag 114. Such devices can include mobile phones with NFC interrogators incorporated into the phones, or any other devices with NFC interrogators associate therewith. Placing a suitably equipped mobile phone (or other NFC-enabled device) in the indicated region 116 can allow for the reading of the contents of the NFC tag 114. Such contents may be any type of information or data, for example data which could point to a website that contains information related to the visual information 108 of the poster 106.

The smart poster or sign may also be equipped with a low power receiver or "watch dog" device that would allow the NFC tag 114 to detect the presence of an NFC reading device, such as a smart phone, at a greater range than the reading device is capable of typically interacting with NFC tags on the surface or in an area. One use for the pre-detection or watch dog device is to allow a security sweep for intruder/pirate tags to be performed before the user or consumer comes close enough to read pirate tags if present. As the sweep is only activated when a consumer approaches, the average power consumption is very low, allowing the function to be supported by a battery which can be resident on the tag or associated with the tag. Pre-detection by such a watch dog device could also be used to activate visual, audible or other functions, such as illuminating the sigh or extending a greeting to the on-coming consumer. By placing a watch dog device within the protected range, the NFC tags can be monitored, and, as the watch dog units can be battery powered because of pre-detection, they can be deployed flexibly without the cost of additional wiring or support structures to implement use of the watch dog device.

Still referring to exemplary FIG. 1, a pirate or vandal tag 104 is shown as being affixed to a visual surface of poster 106. The contents of the vandal tag 104 might contain any type of information or data. In one embodiment, the contents of the vandal tag include information or data that redirects a user's device to a website that contains unauthorized information or could install malicious software on the reading device.

As described with respect to exemplary FIG. 1, authorized NFC tag 114 is associated with poster 106. Authorized NFC tag 114 may be utilized alone to provide desired or authorized communications between authorized NFC tag 114 and an NFC-enabled reader, or may be used with an NFC security system, as described in more detail herein. Additionally, authorized NFC tag 114 may be such that it can function to prevent or limit the functionality of vandal tag 104, or other unauthorized or undesired devices, that are placed in proximity or directly overlapping the NFC tag 114. Authorized NFC tag 114 may be formed in any of a variety of manners, and include elements such as a relatively high dielectric constant substrate, a relatively high magnetic permeability substrate, or include areas of a conductive material beyond that needed to form the antenna. Relatively high dielectric constant material can be further defined as a material with a dielectric constant greater than that of silicon dioxide, or 3.9. Example materials include hafnium silicate, zirconium silicate, hafnium dioxide and zirconium dioxide, but any high dielectric material known in the art may be used. Magnetic permeability is usually expressed as relative magnetic permeability ($\mu_R$), the ratio of the permeability of a specific medium to the permeability of free space, or the ability of a material to attract and sustain a magnetic field. High relative magnetic permeability can be defined as greater than 1. Examples of high relative magnetic permeability substrates include ferro-magnetic materials such as nickel or iron. [http://www.microwaves101.com/encyclopedia/highpermeability.cfm]. These features will cause a vandal tag placed in proximity to be strongly de-tuned, and therefore reduced in functionality. In some embodiments, the structure supporting the poster or the poster itself will incorporate relatively high dielectric constant, high magnetic permeability and conductive areas, or any combination of these, and authorized tag 114 may be designed for a loaded resonant frequency that can compensate for these obstructions or interferences. Unauthorized or vandal tags that are designed for benign substrates typical to many applications, may have their performance significantly impaired or rendered incapacitated due to the presence and functionality of the elements incorporated into the structure, poster, or both. Authorized tag 114, by having prior knowledge of the surface conditions, may implement the concept of a having a special "keyed" or authorized RFID device properties to function on the surface. Thus, any unauthorized or vandal tags without this knowledge may not function to provide their intended communication capabilities.

FIG. 2 can provide an exemplary view of a display 200 with a display frame 202 that may incorporate a poster 206 having visual information 208 and an authorized NFC tag 214. Additionally, in such an exemplary embodiment, an NFC reading zone indicated by a visual guide 216 may also be provided. Further, the display 202 can incorporate an NFC security system (described in more detail with respect to exemplary FIG. 3 below) which can protect the display 200 from vandal tag 204, or any number of other vandal tags. The security system can include a security controller 210, one or more sub-assembly circuit boards 212 associated with the security controller 210, and an NFC antenna 218. For example, the sub-assembly circuit board or boards 212 of the security controller 210 can provide functionality for the operation of the security system. Additionally, NFC antenna 218 can provide an interrogation area which may be substantially equivalent to the entire surface of the display 200. The scanning area can thus include the poster 206, the NFC indicated reading zone 216 and all other surfaces of the display frame 202, as well as some areas located near or proximate the display 200, as desired.

Still referring to exemplary FIG. 2, an unauthorized tag 204 may be shown as affixed to a portion of the poster 206. The security system, as described in more detail below, may periodically energize the NFC antenna 218 to scan for any and all NFC tags affixed to the display 202. The security system could then detect the vandal tag 204 (or some other unauthorized device) and select an appropriate or desired action or set of actions to perform. In one exemplary embodiment, the security system may first scan the memory contents of the vandal tag 204. Then, depending on the persistent states of the vandal tag 204 the security system may attempt to overwrite the memory contents of the vandal tag 204 or otherwise disable the functionality of the vandal tag 204 using a "kill" command commonly found with most NFC tags. Additional or alternative steps which could be performed by the security controller 210 may include jamming the communication channel with noise, sounding an alarm, or turning off display lights associated with display 200 to indicate an out of order state, or signaling an alert using network connections incorporated into the system. Such steps are described in more detail as follows.

FIG. 3 can provide an exemplary view, in functional block diagram form, of components of a security system 300 used in conjunction with NFC or RFID systems. The security controller 210 may be the primary controller to all other controllers in the system. The secondary controllers in the system shown in this exemplary embodiment can include the network controller 320, NFC controller 322 and display controller 310, as well as others, as desired. The secondary controllers 310, 320, 322 in this exemplary embodiment may be connected to the security controller 210 via cables, such as cables 318, 312, and 314. The network controller 320 may further include network transceivers that can support wired standards such as Ethernet or wireless network standards such as cellular network, Wi-Fi and Bluetooth connections, or any other wired or wireless standards, as desired. The NFC controller 322 can provide for NFC functions such as, but not limited to, interrogation, reading, writing and disabling NFC tags. The NFC controller 322 may be connected via cable 308 to the NFC antenna 218. The NFC antenna 218 can include one or more near field elements that could provide energy and communications to NFC tags located in proximity to the NFC antenna 218, and may be disposed in any location on or about display 200, for example in frame 202. The display controller 310 can provide for sending and receiving signals from the display 200 through the connecting cable 306.

Still referring to exemplary FIG. 3, the display 200 can contain components or methods of controlling electronics in the display 200, for example visual lighting, auditory electronics speakers, buzzers and locking mechanisms. The display 200 can indicate states through the use of toggle switches, or any other desired components. Additionally, sensors incorporated into the display 200 can include light sensors, motion sensors, proximity sensors, vibration sensors, and the like. Signals from sensors and switches may provide information for control of scanning intervals and security elements of the NFC display 200. For example, the security system 300 can be programmed to stop scanning when a user or consumer is present so that the user's NFC mobile device is not interfered with and a desired NFC communication may take place.

Referring now to both exemplary FIG. 2 and exemplary FIG. 3, an area protected by the NFC security system 300 can be one or more regions or zones. Such regions or zones can be any size deemed appropriate or desired for the protection of the display 200. The zone can be within the boundary of the display. The zone of security may, in some exemplary embodiments, extend past the physical boundary of the display 200. Further, for an NFC security system 300 with multiple zones, the size and configurations of each zone can be different from the configuration of all other zones. The technology used to secure such a zone can be achieved by any desired combination of near field or far field structures. Examples of near field structures can include inductive coils, capacitive structures or transmission lines. Examples of far field structures can include any physical configuration of conductive material used as an antenna for detecting electromagnetic wave energy. The structures used for the security of a zone can be operated in configurations suitable for RFID interrogation, detecting alternating fields or transmission of alternating fields.

In one exemplary embodiment, the zone or area, which may correspond to the size of frame 202, can have of a large inductive coil antenna 218 which can follow an outside perimeter directly behind the visual part of the display 200. The coil antenna 218 may be energized in order to provide an alternating magnetic field for deactivating unauthorized tags 204. The energy and control of the coil antenna 218 can be provided by NFC controller 322, which can attempt to interrogate any NFC tags, such as a vandal tag 204, affixed to the visual face of the display 200.

In another exemplary embodiment, and still referring to both FIG. 2 and FIG. 3, a security scanning zone can be created by one or more magnetic probes positioned on the display 200. The magnetic probes may be used to scan for alternating magnetic fields which might correspond to an NFC interrogation system of a user's device. High power fields detected in zones where no authorized NFC tag exists, such as authorized NFC tag 214 located proximate indicator 216, could indicate the presence of an unauthorized tag 204 on the display.

In yet another exemplary embodiment, a secure zone can be provided by an antenna 218 inside the display 200 which may record far field signals at an NFC operating radio frequency. The signals can be analyzed by a component of the security system for timing and content related to the authorized NFC tag 214 on the display 200. Discrepancies or irregularities in the analyzed data might indicate the presence of an unauthorized tag 204.

In still another exemplary embodiment, the security system may initiate scans of an area or zone associated with display 200. This can be done through a watch dog type device or other components provided for this activity. Scanning activity performed by the security system can be operated by constant polling or may be triggered by conditional rules, as desired. Conditional control of the scanning activity may have the benefit of a lower power usage or consumption of the display 200 and may also reduce potential interference with legitimate NFC activity by users of the display 200, such as a reading of authorized NFC tag 214. Parameters that may be used for triggering NFC security scanning activity can include, but is not limited to, time, sensor states, display states, or external requests. Examples of time parameters include, but are not limited to, regular intervals, fixed time of day, or a timed interval after a conditional state change of another parameter. Examples of sensor states include, but are not limited to, infrared, acoustic, proximity, and vibration sensors, as well as environmental sensors such as light, temperature and humidity. Examples of display states can include, but are not limited to, user NFC interrogation activity or initialization directly after a new authorized NFC tag 214 has been installed. Examples of external requests can include, but are not limited to, signals and communication sent via wireless communication methods associated with network controller 320, such as Bluetooth, NFC or Wi-Fi as well as wired communication from connections such as an Ethernet connection.

Conditions for triggering scanning activity may further be any logical or desired combinations of parameter triggers and states as well as sequential conditions of gating previously triggered activity. For example, the security system 300 may conduct a scan at regular intervals during daytime hours while light sensors in the top of the display 200 are triggered by overhead fluorescent lights. In another exemplary embodiment, the security system 300 may scan the display after a designated time interval after an acoustic sensor in the front of the display 200 has been triggered. In yet another exemplary embodiment, security scans may be triggered when the authorized NFC tag 204 is interrogated by the user.

Still referring to both exemplary FIG. 2 and exemplary FIG. 3, if the security system 300, after conducting a scan, detects an unauthorized NFC tag 204 or corrupted authorized NFC tag 214, the NFC security system 300 may select an appropriate action or set of actions to be performed and perform them. The security actions performed by the system 300 may be any type of actions, for example ranging from direct actions performed on an unauthorized tag 204 to progressively more indirect actions in an attempt to mitigate threats caused by the unauthorized tag 204. For example, it may be desired for the direct actions to be attempted first, with indirect actions performed for redundancy and backup.

Examples of direct actions to an unauthorized tag 204 can include inspection of memory contents and operational states, commands issued to disable the tag 204, reprogramming the memory contents of the tag 204, or jamming the communication channel of said tag 204. The inspection of the memory contents and states of the unauthorized tag 204 can determine a threat level and severity of a security violation. The inspection might also aid in the identification of unauthorized NFC tags that contain code which could exploit weaknesses in user device software or contain pointers to install malicious software on a user's device. The memory contents of an unauthorized tag 204 may be recorded by the security system for later analysis by authorized personnel. Disabling unauthorized tags 204 can be achieved via known and established commands commonly available for NFC tags such as the "kill" command commonly used for privacy functions. Jamming the communication channel can be implemented by methods such as issuing read commands to the unauthorized tag 203 or transmitting random noise or pulses to disrupt communication with the unauthorized tag 204.

Other examples of indirect security actions can include alerting authorized personnel, warning a user, or disabling the display 200. Alerting authorized personnel can be achieved via a wireless or wired network communication channel available to the security system, for example through network controller 320. If a network connection is not available to the security system, coded messages can be sent via reprogramming the authorized NFC tag 214. In such an example, information can be embedded into the URL pointer that sends coded messages to the website server but does not affect the website content that a user will see on their NFC enabled device. Another exemplary method of signaling can be achieved by storing the alert in the memory of the security system 300 for communication during maintenance intervals by authorized personnel. Visual displays such as lighted indicators can be used to request maintenance by authorized personnel. Such indicators may be provided on or around display 200, on frame 202, on or in conjunction with poster 206, or as a part of indictor 216. Similarly, warnings to the user can be achieved by audio or visual indicating lights or by reprogramming the authorized NFC tag 214 to indicate a problem with the display 200. Disabling the display 200 can be also be achieved by reprogramming the authorized NFC tag 214 in combination with switching off the display 200 backlight to indicate a non-functional state.

In some other exemplary embodiments, the NFC security system 300 can interrogate the intended and authorized NFC tag 214 to check if memory contents and identification codes remain uncorrupted. A previously stored unique identification code and known good data of the authorized NFC tag 214 can be established during the period of the installation of the authorized tag 214 into the display 200 by authorized personnel. If the security system determines that the authorized NFC tag 214 is non-functional or has corrupted memory contents, a set of actions similar to the previous described actions for unauthorized tags 204 can be performed.

In a further exemplary embodiment, an integrated RFID interrogator system, such as NFC controller 322, can verify a unique identification code and memory contents belonging to the authorized NFC tag 214. The unique identification code and memory contents of the authorized NFC tag 214 may then be compared with previously stored, known good data. If corrupted data is detected in the authorized NFC tag 214, the integrated RFID reader (e.g. NFC controller 322) can start repeatedly issuing tag reads to the authorized NFC tag 214. Such repeated tag reads may jam the communication channel and prevent interrogation of the authorized NFC tag 214 by a user's NFC-enabled device. Additionally, the display 200 backlight can be switched off, or some other indicator provided, which signals that the display 200 is no longer functioning. The display 200 may return to normal use and appearance after the issue is corrected.

In another exemplary embodiment, the NFC security system 300 can report the presence of an unauthorized NFC tag 204 to an internet server via a cellular network connection, or other desired communication method. Such a report may be sent using network controller 320. The memory contents of the unauthorized tag(s) 204 may then be uploaded to the server using network controller 320 for later analysis. Authorized personnel may also be alerted via a message from the server or directly from network controller 320 of the nature of the unauthorized tag 204.

In still another exemplary embodiment, the detection of an unauthorized NFC tag 204 can be made through an integrated RFID interrogation system, such as with NFC controller 322. As discussed previously, the antenna 218 of the security system can encompass the perimeter of the display 200, for example inside frame 202, so as to protect the entire surface of the display 200 and region around the display 200. The NFC controller 322 can execute an NFC (or RFID, as desired) inventory function to check for the presence of unauthorized tags 204. The inventory function can determine the quantity and identification codes of NFC tags 204 in proximity to the energized antenna coil 218. Upon detection of an unauthorized tag 204, the security system 300 can disable the unauthorized tag 204 by reading the unique identification code of the tag and executing a kill function to the unauthorized tag 204, as described in previous exemplary embodiments.

In yet another exemplary embodiment, the security system 300 can include an RF or NFC radio detection system that can scan for local emissions of RF energy in the 13.56 MHz frequency band. Such scanning may be accomplished through the use of NFC controller 322, an RFID controller or any other component with the desired scanning or interrogating capabilities. The system may then compare the detection of emissions above specified signal strength with timing of interrogations of the intended and authorized tag 214. RF or NFC emissions may then be analyzed by the security system 300 to determine if a user in proximity of the display 200 is reading an unauthorized tag 204. Statistical information about the presence and nature of the emissions can then be used to alert maintenance personnel to the potential presence of unauthorized tags 204.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A security system for detecting unauthorized near field communication (NFC) tags, comprising:
    a NFC radio detection system having a NFC controller with scanning or interrogating abilities and with at least one sub-assembly circuit boards;
    an antenna, periodically energized by the NFC radio detection system;
    a structure for housing the NFC radio detection system and at least one authorized NFC tag;
    a display provided on the structure and containing the at least one authorized NFC tag;
        at least one unauthorized NFC tag emitting a radio frequency (RF) signal applied on or near the display or the structure; and
    where the at least one authorized NFC tag is programmed with information about a surface of the display and has authorized radio frequency identification (RFID) device properties to function on the surface and the at least one unauthorized NFC tag without the information about the surface of the display does not provide intended communication capabilities;
    the NFC controller interrogating an area including the display and the structure to detect whether the at least one unauthorized NFC tag is present; and
    an alarm to signal the presence of the at least one unauthorized NFC tag and selects an action or set of actions to perform based on results from interrogating the area.

2. The security system of claim 1, wherein the area extends past a physical boundary of the display.

3. The security system of claim 1, wherein the area corresponds to a size of the display.

4. The security system of claim 1, wherein the security system further includes the antenna that follows an outside perimeter of the display.

5. The security system of claim 4, wherein the antenna is an inductive coil antenna.

6. The security system of claim 1, further comprising magnetic probes positioned on the display.

7. The security system of claim 1, wherein the security system scans the at least one unauthorized NFC tag and overwrites the at least one unauthorized NFC tag.

8. The security system of claim 1, wherein the security system disables a functionality of the at least one unauthorized NFC tag.

9. The security system of claim 1, wherein the display is a smart poster.

10. The security system of claim 9, wherein the smart poster includes a low power receiver.

11. The security system of claim 1, wherein the at least one authorized NFC tag is designed for a loaded resonant frequency that can compensate for the at least one unauthorized NFC tag.

12. A security system for detecting unauthorized near field communication (NFC) tags, comprising:
    a NFC radio detection system having a NFC controller with scanning or interrogating abilities, where scanning is operated by polling or triggered by conditional rules;
    a structure for housing the NFC radio detection system and at least one authorized NFC tag;
    a display provided on the structure and containing the at least one authorized NFC tag;
    at least one unauthorized NFC tag emitting a radio frequency (RF) signal applied on or near the display or the structure, and the at least one authorized NFC tag is designed for a loaded resonant frequency that can compensate for the at least one unauthorized NFC tag; and
    where the at least one authorized NFC tag is programmed with information about a surface of the display and the at least one unauthorized NFC tag without the information about the surface of the display does not provide intended communication capabilities;
    the NFC controller interrogating an area including the display and the structure to detect whether the at least one unauthorized NFC tag is present;
    magnetic probes positioned on the display; and
    an alarm to signal the presence of the at least one unauthorized NFC tag to perform based on results from interrogating the area.

* * * * *